(12) United States Patent
Levy

(10) Patent No.: US 6,466,981 B1
(45) Date of Patent: *Oct. 15, 2002

(54) METHOD USING AN ASSIGNED DYNAMIC IP ADDRESS AND AUTOMATICALLY RESTORING THE STATIC IP ADDRESS

(75) Inventor: Steven B. Levy, Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,026

(22) Filed: Jun. 30, 1998

(51) Int. Cl.[7] .......................... G06F 15/16; G06F 15/177

(52) U.S. Cl. ...................... 709/227; 709/217; 709/218; 709/220

(58) Field of Search ................................ 709/203, 218, 709/219, 220, 221, 222, 217, 223, 225, 227, 228, 237, 240, 245, 250; 705/40; 370/401

(56) References Cited

U.S. PATENT DOCUMENTS

| | | | | |
|---|---|---|---|---|
| 5,764,736 A | * | 6/1998 | Shachar et al. | 370/93.09 |
| 6,006,264 A | * | 12/1999 | Colby et al. | 709/226 |
| 6,009,474 A | * | 12/1999 | Lu et al. | 709/245 |
| 6,012,084 A | * | 1/2000 | Fielding et al. | 709/205 |
| 6,012,088 A | * | 1/2000 | Li et al. | 709/219 |
| 6,012,090 A | * | 1/2000 | Chung et al. | 709/219 |
| 6,012,100 A | * | 1/2000 | Frailong et al. | 709/250 |

OTHER PUBLICATIONS

Newton's Telecom Dictionary, Newton, Harry, Flatiron Publishing, 14th Ed., Mar. 1998.*

Finney, Paul Burnham, "Microsoft is moving into the business of supplying fast Internet access for hotel guests." *The New York Times*, Feb. 18, 1998, Section D, p. 6, col. 3, Business/Financial Desk.

Neil, Stephanie, "Business Checks In: High–tech hotels are meeting the needs of corporate travelers." *PC Week*, Feb. 16, 1998, p. 73.

* cited by examiner

*Primary Examiner*—Le Hien Luu
*Assistant Examiner*—Beatriz Prieto
(74) *Attorney, Agent, or Firm*—Banner & Witcoff, Ltd.

(57) ABSTRACT

The invention is a technology that provides a computer user with a connection to a communications server when they connect their computer to an access port. The technology automatically configures the computer for communication with the server and then restores the initial computer configuration after the session. In one example of the invention, the user simply connects their laptop computer to an Ethernet port in a hotel room and powers-up the computer. The laptop computer executes a small access software application that directs the laptop computer to process a Uniform Resource Locator (URL) that is broadcast over the Ethernet network by an access server. The access software application directs the computer to execute a web browser using the URL. The web browser directs the computer to retrieve and display a web page represented by the URL from a communications server. The web page contains basic service information. After the user responds to the web page, the communications server directs the communications system to provide the user with a high-speed connection to the Internet. The user can browse the World-Wide Web, access e-mail or exchange files with their corporate network over the high-speed Internet connection. The high-speed Internet connection speeds up the data transfer, conserves telephone system capacity, and avoids costly long-distance charges.

28 Claims, 9 Drawing Sheets

METHOD USING AN ASSIGNED DYNAMIC IP ADDRESS AND AUTOMATICALLY RESTORING THE STATIC IP ADDRESS

FIELD OF THE INVENTION

The invention is related to the field of communications systems, and in particular, to a system for connecting a computer to a communications system.

1. Problem

There is a growing demand for systems that transparently connect a user's computer to a communications system. This demand is especially acute with regard to high-speed connections to advanced communications systems, such as the Internet. High-speed Internet connections are typically installed to the home or office. In a typical home system, an Integrated Service Digital Network (ISDN) connection is provided to the home where it is connected to a desktop computer. In a typical corporate system, a corporate server and multiple desktop computers are connected to a Local Area As Network (LAN). The corporate server provides an intranet over the LAN to the desktop computers. The corporate server is also connected to the Internet over a high-speed connection through a firewall. The high-speed connection provides the desktop computers with high-speed Internet access through the corporate server and firewall.

Unfortunately, a user does not have access to the high-speed connection when they travel away from the home or office. The user typically needs to communicate while traveling using a portable laptop computer to access e-mail, Internet services, or corporate networks. The present systems that interface laptop computers with communications systems are problematic.

One existing solution uses a conventional telephone line to connect a portable laptop computer to an Internet service provider or to a corporate network. However, this solution is undesirable because the conventional telephone line is not a high-speed connection and data transfer is slow. The use of the telephone line for the computer reduces the capacity of the telephone system for conventional telephone traffic. In addition, the telephone connection is expensive to maintain for long-distance calls.

Another solution provides high-speed Internet access through kiosks located in various public places. The kiosks are equipped with their own computers that are already connected to a high-speed connection. However, the kiosk solution is undesirable because the kiosks do not allow the user to connect their own laptop computer directly to the high-speed connection, and the kiosk computer may not have the software applications that are desired by the user. In addition, the user may have personal configurations on the laptop computer that are required for a productive Internet session. For example, a web browser in the laptop computer may have personalized settings for important web sites, or an encryption program in the laptop computer may have keys that are required to exchange files with a corporate site.

Another solution allows users to connect their laptop computer directly to a high-speed connection. The user must re-configure the laptop computer to make the high-speed connection operational. This solution is undesirable because configuring the laptop computer to operate over a high-speed connection is a complex task beyond the skill of the typical user. Multiple operations are required before the laptop computer is properly configured to communicate over the high-speed connection. Further, the laptop computer must be re-configured to its original state when the user returns to the office for communication with the corporate network. The complex configuration and re-configuration of the laptop computer should be avoided.

Many communications software packages for the above-described solutions are available for laptop computers. These software packages are relatively large in order to generate screens offering numerous features. Some examples of these software packages are web browsers, configuration wizards, and modem control utilities. At present, these software packages are not designed to automatically configure communications software in the computer to connect through an access port to a server for a high-speed connection. In addition, these software packages require a relatively large amount of memory that diminishes the computer's storage capacity. A large software package can also take a long time to download if it must be retrieved from a server.

At present, computer users need a technology that allows them to connect their own computer through an access port to a server that typically provides a high-speed connection to an advanced communications system, such as the Internet. The technology should not require the user to perform the complex task of configuring the computer to communicate over a high-speed connection and then re-configuring the computer for the office network. The technology should also be efficient to avoid loading a large software program onto the computer.

2. Solution

The invention solves the above problems with technology that provides a computer user with a connection to a communications server when they connect their computer to an access port. The technology automatically configures the computer for communication with the server and then restores the initial computer configuration after the session. Typically, the user need only connect the computer to the access port to automatically receive a web page from the communications server offering a high speed Internet connection.

The invention includes an access server that broadcasts an address over a network. A computer connected to the network executes an access software application that directs the computer to process the broadcast. The access software application also directs the computer to execute a communications software application using the address from the broadcast. When executed, the communications software application directs the computer to communicate with a communications server at the address. The communications server typically offers high-speed Internet access to the user.

In one example of the invention, the user simply connects their laptop computer to an Ethernet port in a hotel room and powers-up the computer. The laptop computer executes a small access software application that directs the laptop computer to detect a Uniform Resource Locator (URL) that is broadcast over the Ethernet network by an access server. The access software application directs the computer to execute a web browser using the URL. The web browser directs the computer to retrieve and display a web page represented by the URL from a communications server. The web page contains basic service information. After the user responds to the web page, an application server authorizes the user, and if the user is authorized, the application server directs a firewall in the communications system to provide the user with a high-speed connection to the Internet. The user can access e-mail or exchange files with their corporate network over the high-speed Internet connection. The access software application restores the initial settings to the computer after the communications session, so the user can simply plug back into their home or office network without manual re-configuration.

The access software application leverages the web browser in the computer to provide the display and establish Internet connections. Use of the web browser allows the access software application to remain relatively small and preserve memory and performance for other user applications on the computer. In addition, the user is not required to use conventional telephone lines with a dial-up modem connection. The high-speed Internet connection speeds up the data transfer, conserves telephone system capacity, and avoids costly long-distance charges.

DETAILED DESCRIPTION

Figure 1:
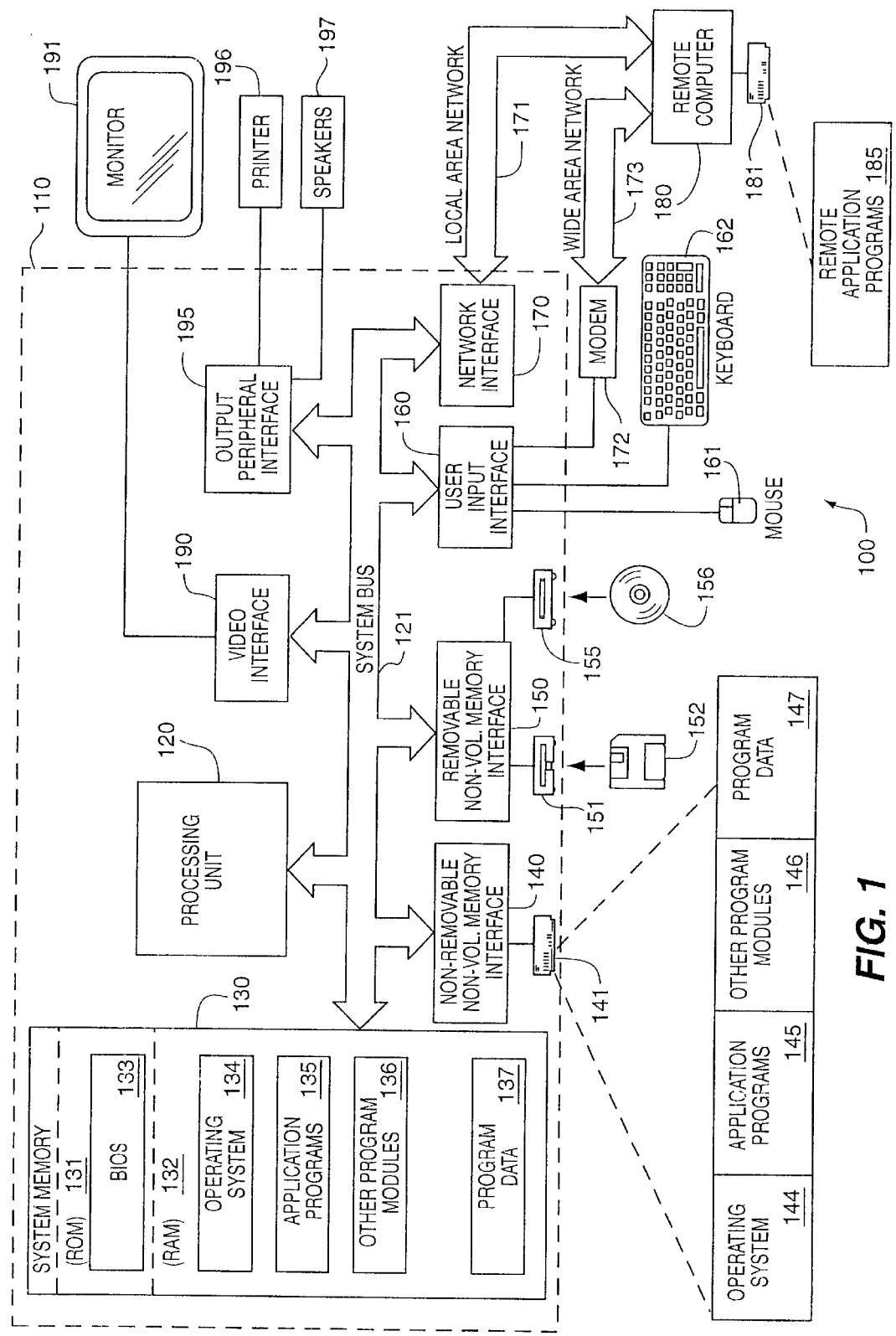
FIG. 1 illustrates an example of a computing system.

Computing System Environment—FIG. 1

FIG. 1 illustrates an example of a computing system environment 100 used in the context of the present invention. The computing system environment 100 is only one example of a suitable computing environment and is not intended to suggest any limitation as to the scope of use or functionality of the claimed invention. Neither should the computing environment 100 be interpreted as having any dependency or requirement relating to any one or combination of components illustrated in the exemplary computing system environment 100.

The claimed invention is operational with numerous other general purpose or special purpose computing system environments or configurations. Examples of well known computing systems, environments, and/or configurations that may be suitable for use with the claimed invention can include, but are also not limited to, a general purpose Personal Computer (PC), hand-held or lap top computers, multi-processor systems, microprocessor-based systems, programmable consumer electronics, network computers, Personal Communication Systems (PCS), Personal Digital Assistants (PDA), minicomputers, mainframe computers, distributed computing environments that include any one or more of the above computing systems or devices, and the like.

The claimed invention may also be described in the general context of computer-executable instructions that are executable on a PC. Such executable instructions include the instructions within program modules that are executed on a PC for example. Generally, program modules include, but are not limited to, routines, programs, objects, components, data structures, and the like that perform discrete tasks or implement abstract data types. The claimed invention may also be practiced in distributed computing environments where tasks are performed by remote processing devices that are linked through a communications network. In a distributed computing environment, program modules may be located in both local and remote memory devices.

The exemplary computing system environment 100 is a general purpose computing device such a PC 110. Components of PC 110 include, but are not limited to, a processing unit 120, a system memory 130, and a system bus 121. The system bus 121 communicatively connects the aforementioned components and numerous other cooperatively interactive components.

Processing unit 120 is the primary intelligence and controller for PC 110 and can be any one of many commercially available processors available in the industry. System bus 121 may be any combination of several types of bus structures including, but not limited to, a memory bus, a memory controller bus, a peripheral bus, and/or a local bus. System bus 121, also referred to as an expansion bus or I/O channel, can be based on any one of a variety of bus architectures including, but not limited to, Industry Standard Architecture (ISA) bus, Micro Channel Architecture (MCA), Enhanced ISA (EISA), Video Electronics Standards Association (VESA) local bus, and Peripheral Component Interconnect (PCI) also known as Mezzanine bus.

System memory 130 is a volatile memory that can include a Read Only Memory (ROM) 131 and/or a Random Access Memory (RAM) 132. ROM 131 typically includes a Basic InpuVOutput System (BIOS) 133. BIOS 133 is comprised of basic routines that control the transfer of data and programs between peripheral non-volatile memories that are accessible to PC 110 during start-up or boot operations. RAM 132 typically contains data and/or programs that are immediately accessible to and/or presently being operated on by processing unit 120. Types of data and/or programs in RAM 132 can include operating system programs 134, application programs 135, other program modules 136, and program data 137.

Other components in PC 110 include numerous peripheral devices that are accessible to processing unit 120 by way of system bus 121. The numerous peripheral devices are supported by appropriate interfaces that can include a first non-volatile memory interface 140 for non-removable non-volatile memory device support, a second non-volatile memory interface 150 for removable non-volatile memory device support, a user input interface 160 for serial device support, a network interface 170 for remote device communication device support, a video interface 190 for video input/output device support, and an output peripheral interface 195 for output device support.

Examples of a non-removable non-volatile memory device can include a magnetic disk device 141 or other large capacity read/write medium such as an optical disk, magnetic tape, optical tape, or solid state memory. Types of data often stored on a non-removable non-volatile memory device include persistent copies of programs and/or data being used and/or manipulated in RAM 132 such as operating system programs 144, application programs 145, other program modules 146, and program data 147.

One example of a removable non-volatile memory device can include a magnetic floppy disk device or hard disk device 151 that accepts removable magnetic media 152. Another example of a removable non-volatile memory device can include an optical disk device 155 that accepts removable optical media 156. Other types of removable media can include, but are not limited to, magnetic tape cassettes, flash memory cards, digital video disks, digital video tape, Bernoulli cartridge, solid state RAM, solid state ROM, and the like.

User input interface 160 supports user input devices that can include, but are not limited to, a pointing device 161 commonly referred to as a mouse or touch pad, and a keyboard 162. Other user input devices can include, but are not limited to, a microphone, joystick, game pad, neurostimulated sensor, and scanner, and may require other interface and bus structures such as a parallel port, game port or a Universal Serial Bus (USB) for example.

User input/output devices supported by video interface 190 can include a display monitor 191 or a video camera. Output peripheral interface 195 supports output devices such as printer 196 and speakers 197.

Network interface 170 supports communications access to a remote computing facility such as remote computer 180 by way of LAN 171 and/or Wide Area Network (WAN) 173, or other Intranet or Internet connection. Other remote computing facility types for remote computer 180 can include, but are not limited to, a PC, server, router, printer, network PC, a peer device, or other common network node. A remote computer 180 can typically include many or all of the components described above for PC 110. Modulator/Demodulator (MODEM) 172 can also be used to facilitate communications to remote computer 180. Types of programs and/or data accessible from remote memory device 181 on remote computer 180 can include, but are not limited to, remote application programs 185.

Figure 2:
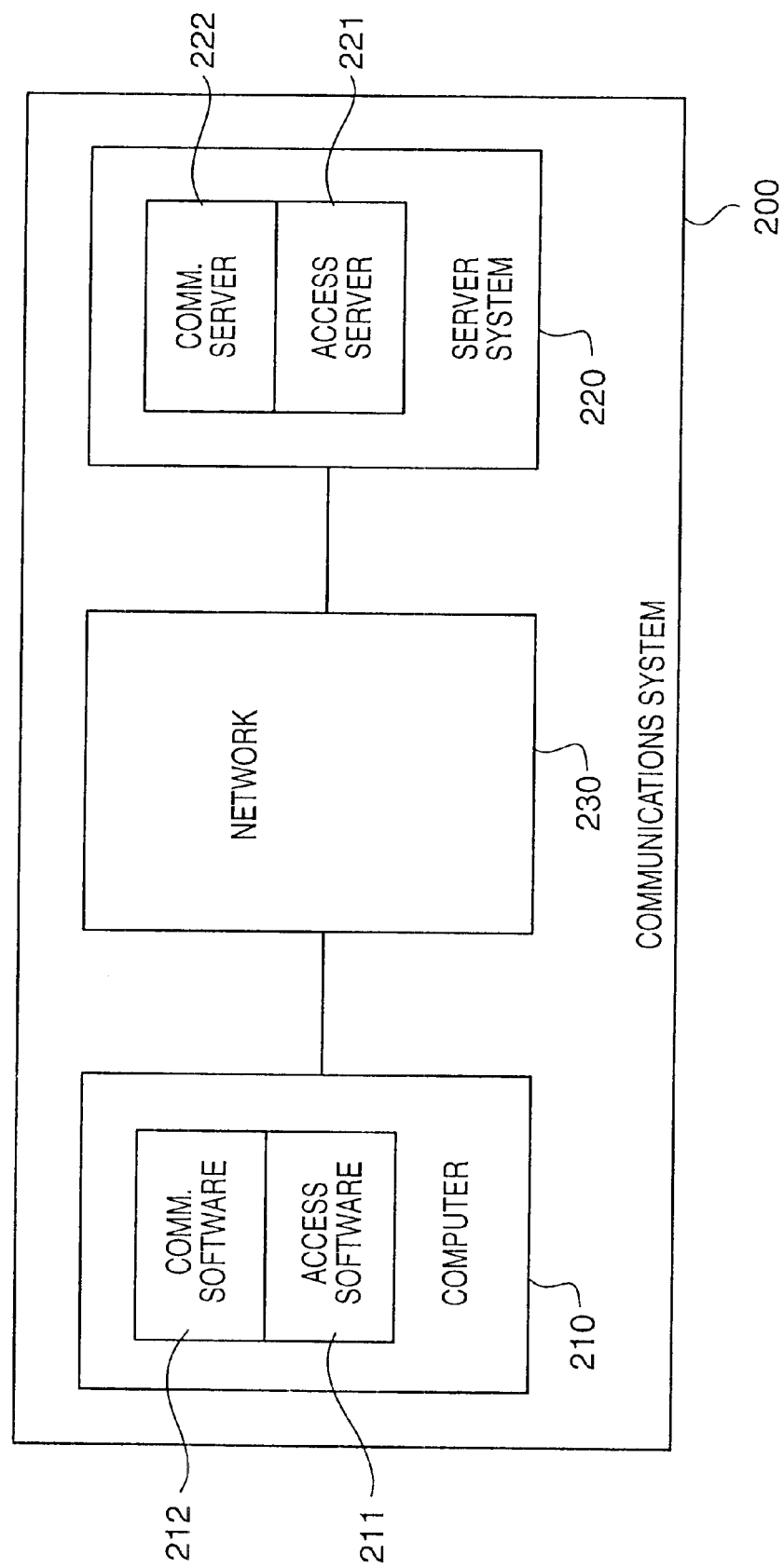
FIG. 2 illustrates an example of a communications system.
Figure 3:
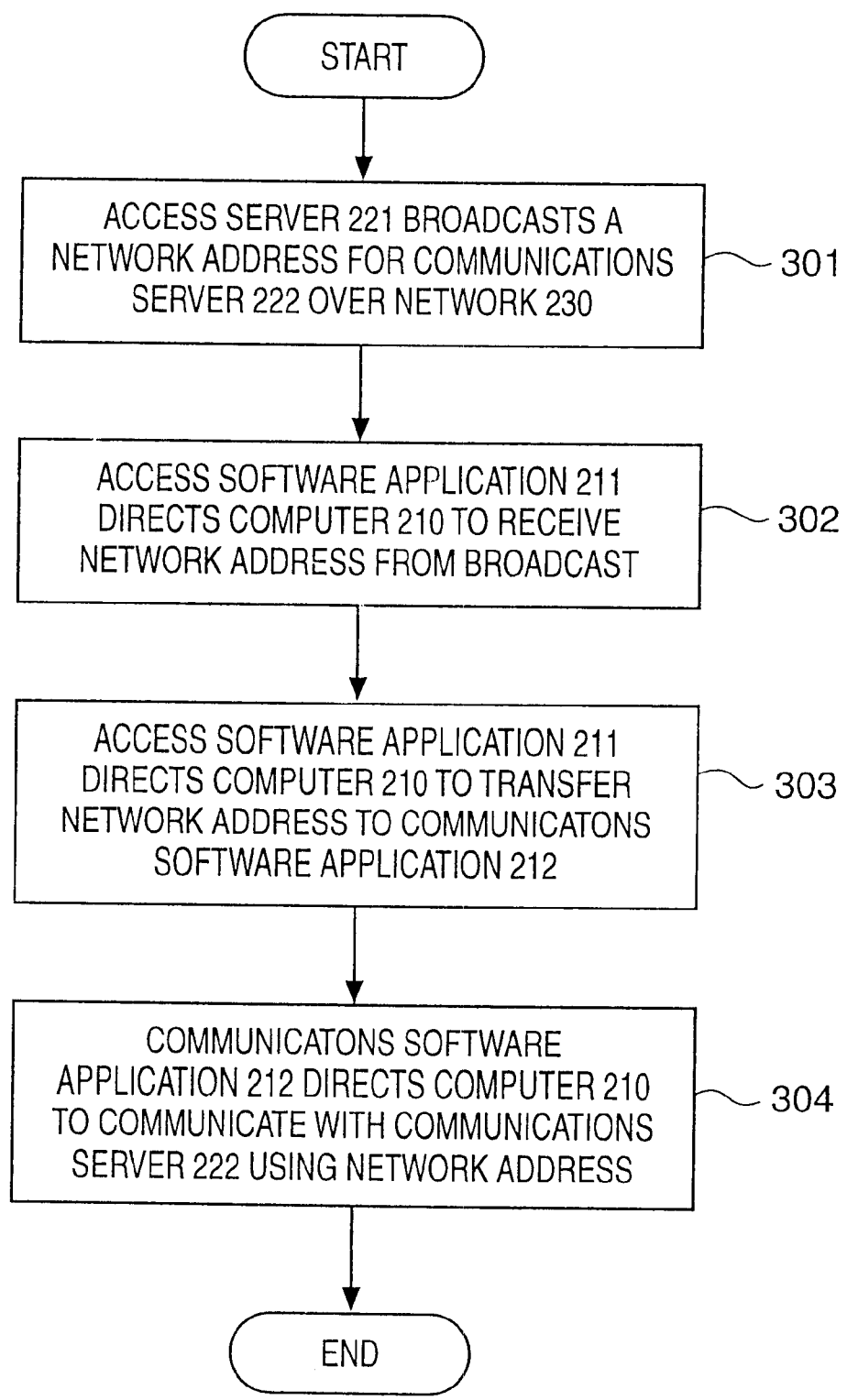
FIG. 3 illustrates an example of communications system operation.

System Configuration and Operation—FIGS. 2–3

FIG. 2 depicts a communications system 200 that is configured and operates in accord with the present invention. Those skilled in the art will appreciate how the computing environment described for FIG. 1 can be applied in the context of FIG. 2. The communications system 200 is comprised of a computer 210, a server system 220, and a network 230. The computer 210 is comprised of an access software application 211 and a communications software application 212. The server system 220 is comprised of an access server 221 and a communications server 222. The network 230 is operationally coupled to the computer 210 and the server system 220.

The computer 210 is typically a portable computing device, such as a laptop or hand-held computer, but the computer 210 could be any device capable of executing the software applications 211 and 212. The software applications 211 and 212 are stored on a computer storage medium and are executed by the computer 210. The software applications 211 and 212 are able to communicate over the network 230 when the computer 210 is appropriately connected. The access software application 211 includes interface instructions and processing instructions. The access software application 211 and the access server 221 initiate communications between the communications software application 212 and the communications server 222. The communications software application 212 and the communications server 222 could be a conventional web browser and web server respectively.

FIG. 3 depicts the operation of the communications system 200. The operation starts at step 301 with the access server 221 broadcasting an address for the communications server 222 over the network 230. The computer 210 is connected to the network 230 and executes the access software application 211. The access software application 211 directs the computer 210 to process the broadcast and obtain the address in step 302. The access software application 211 also directs the computer 210 to execute the communications software application 212 using the address from the broadcast in step 303. The communications software application directs the computer 210 to communicate with the communications server 222 at the address in step 304.

Those skilled in the art are aware that software applications take many forms. In the context of the invention, the software applications 211 and 212 each represent a set of computer-executable instructions. The two software applications 211 and 212 could be integrated into a single software package where the access software application 211 represents a sub-routine or function of the communications software application 212.

Figure 4:
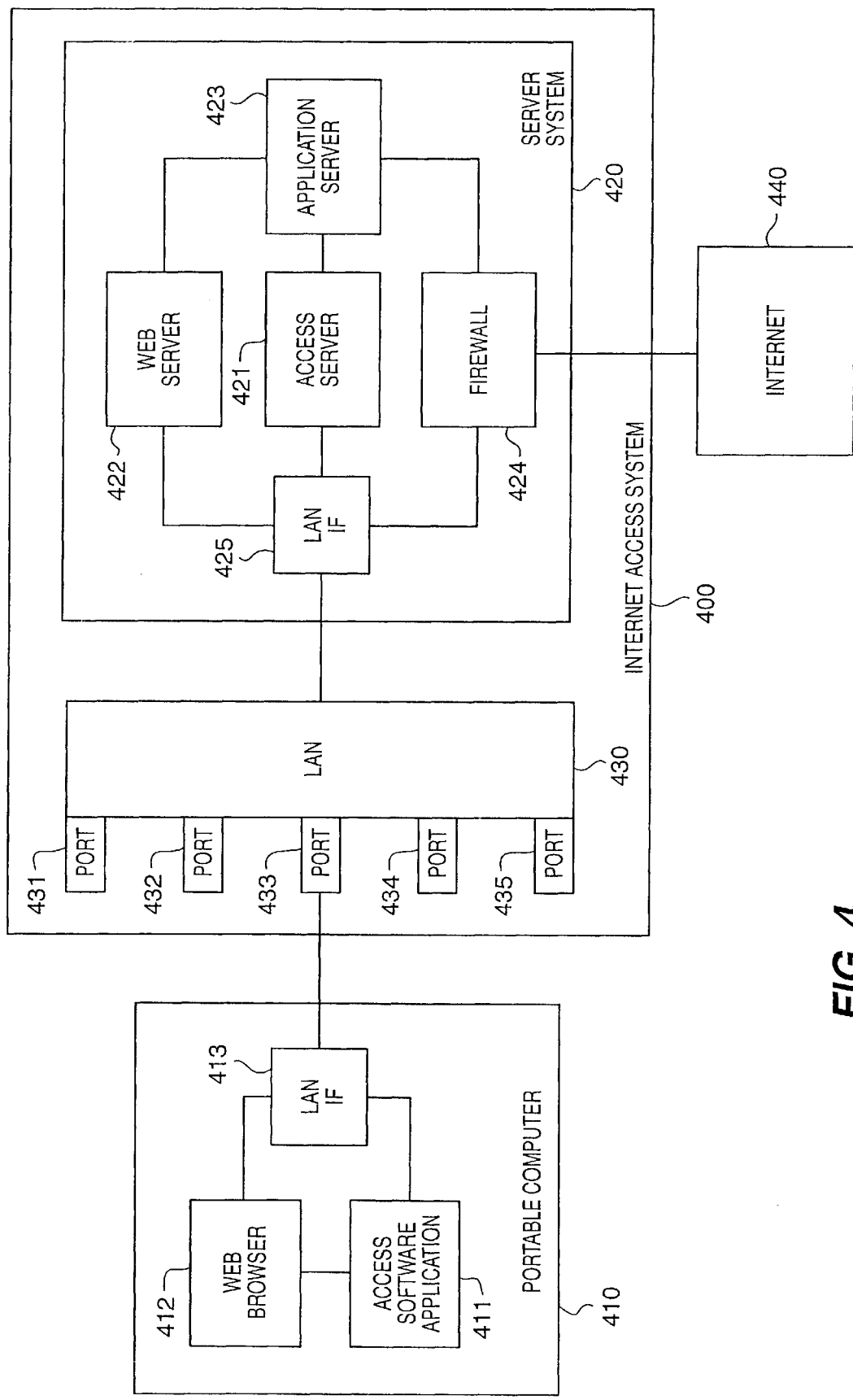
FIG. 4 illustrates an example of an Internet access system.
Figure 5:
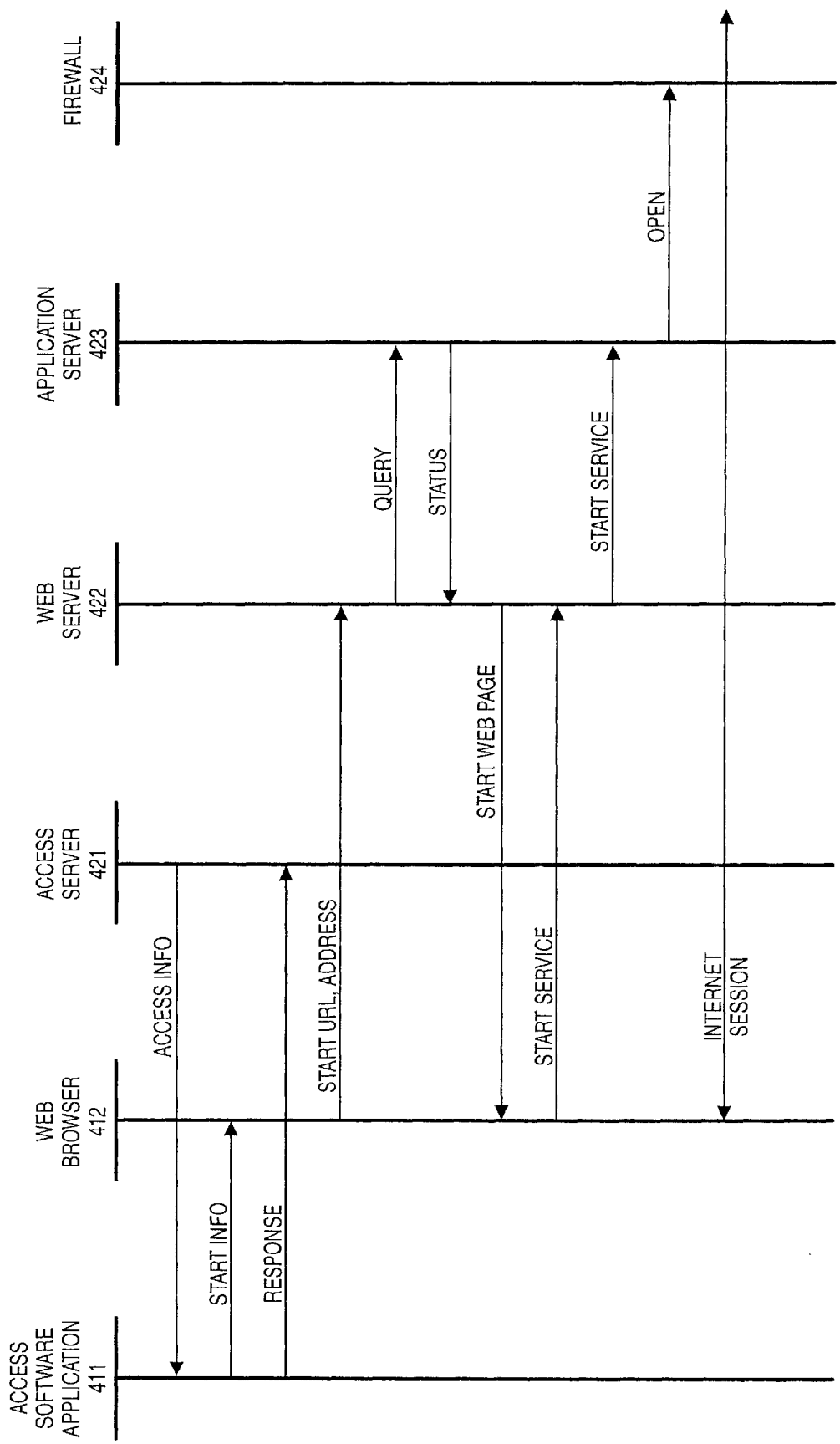
FIGS. 5–6 illustrate an example of Internet access system operation.
Figure 6:
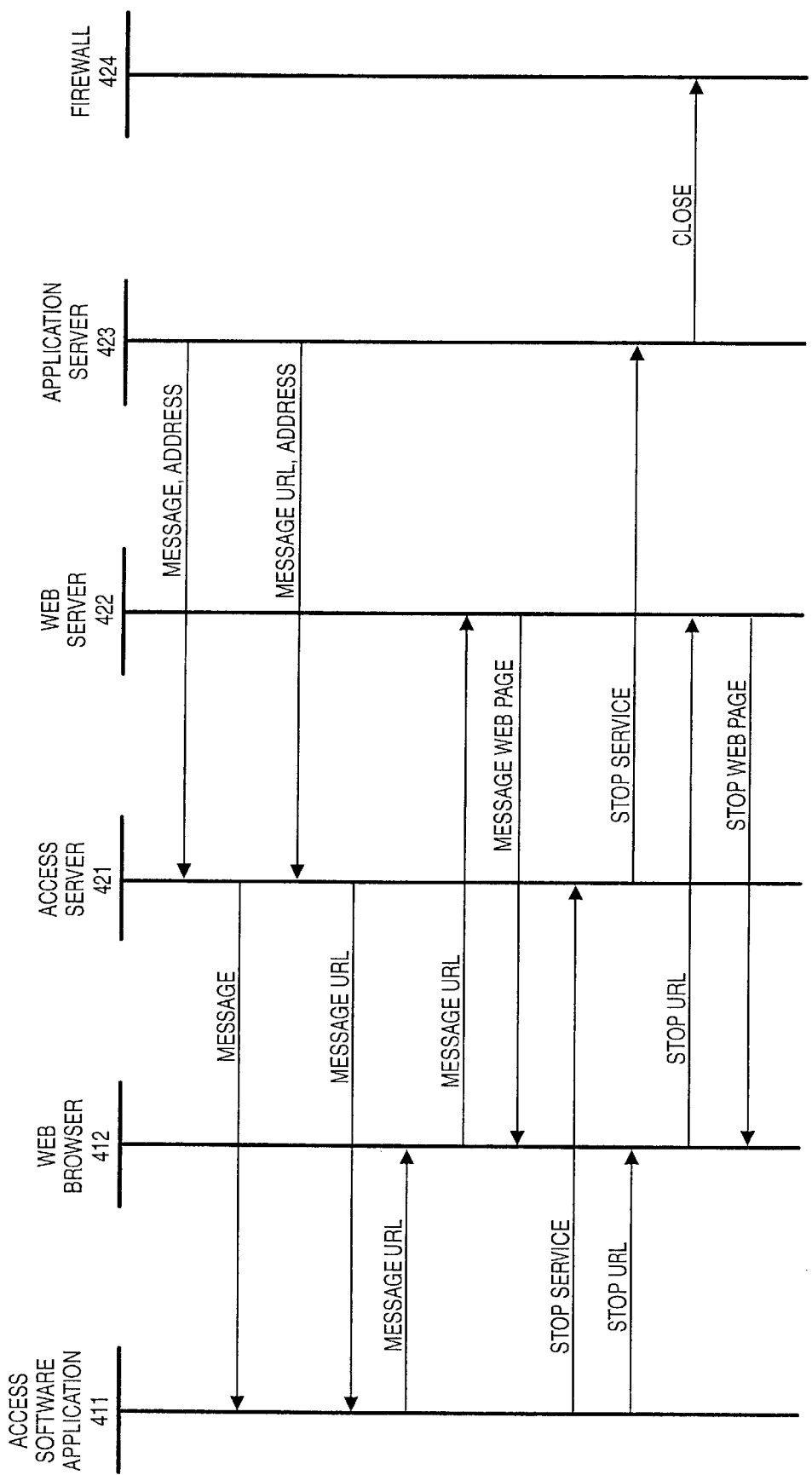

Internet Access System Configuration and Operation—FIGS. 4–6

FIG. 4. depicts a detailed system configuration for an example of the invention, but the invention is not restricted to this particular configuration. Those skilled in the art will appreciate how the computing environment described for FIG. 1 can be applied in the context of FIG. 4. Those skilled in the art will also appreciate how the principles illustrated in this example can be used in other versions of the invention. For example, the example illustrates Internet access, but the invention could be used to access other networks if desired.

On FIG. 4, a portable computer 410 is connected to an Internet access system 400. The Internet access system 400 is connected to the Internet 440. The portable computer 410 comprises an access software application 411, a web browser 412, and a LAN interface 413. The Internet access system 400 comprises a server system 420 and a LAN 430. The LAN 430 includes access ports 431–435. The server system 420 includes an access server 421, a web server 422, an application server 423, a firewall 424, and a LAN interface 425. The LAN interface 413 of the portable computer 410 is connected to the access port 433 of the LAN 430. The LAN interface 425 of the server system 420 is connected to the LAN 430. The firewall 424 is connected to the Internet 440.

The portable computer 410 could be a conventional laptop computer running a conventional operating system. The LAN interface 413 could be a conventional LAN interface, such as an Ethernet card. A cable is typically used to connect the LAN interface 413 to the access port 433. The computer 410 supports the Dynamic Host Configuration Protocol (DHCP) that allows the dynamic assignment of an Internet Protocol (IP) address to the computer 410 when it is connected to the LAN 430.

The web browser 412 is a software application that is executed by the computer 410. The web browser uses Transmission Control Protocol/Internet Protocol (TCP/IP) to communicate over the World Wide Web (Web) portion of the Internet. The web browser 412 typically retrieves a web page from a web server using a Uniform Resource Locator (URL). The web page is used to display information to the user and to collect information from the user. The web page may also contain links to retrieve other web pages. Web terminology and communications are well known.

The access software application 411 is stored on a computer storage medium and is executed by the computer 410. The access software application 411 interacts with the access server 421 to initiate a communications session for the web browser 412. The access software application 411 also interacts with the access server 421 to provide messages to the user and to end the communications session.

A proxy address is used by computers to communicate through a proxy device, such as a server. The computer 410 typically stores a proxy address for use in an office network, but this proxy address is not useful within the internet access system 400. The computer 410 needs to use another proxy address that is provided by the internet access system 400, but when the user returns to the office, the computer 410 will again need to use the original proxy address. To facilitate these needs, the access software application 411 stores the original proxy address and obtains a new proxy address from the internet access system 400. After the communications session is ended, the access software application 411 restores the original proxy address so the user is ready to communicate over their office network when they return home. In some cases, the access software application 411 stores the original static IP address from the web browser 412 and restores it when the communications session is ended.

The storage media for the access software application 411 can take many forms. Software can be stored on a hard disk in the computer 410. Software can be stored on a removable disk coupled with the computer 410. Software can be downloaded from a server into the system memory of the computer 410. Those skilled in the art are familiar with other forms of computer storage media.

The access software application 411 and the web browser 412 are shown as two software applications. Those skilled in the art will recognize that the software applications 411 and 412 could be combined into one software package. The access software application 411 could be included as a feature or function of the web browser 412. Alternatively, the access software application 411 could be included as a feature or function of the operating system.

The LAN 430 is a conventional high-speed network, such as an Ethernet LAN supporting TCP/IP. The access ports 431–435 are LAN terminals, such as Ethernet ports. There would typically be numerous additional access ports, but the number shown is restricted for clarity. The LAN 430 and LAN interfaces 413 and 425 support communications between: 1) the access server 421 and the access software application 411, 2) the web browser 412 and the web server 422, and 3) the web browser 412 and the firewall 424.

The server system 420 could be a computer configured to run version 4.0 of the WINDOWS NT operating system supplied by Microsoft Corporation of Redmond, Washington. The access server 421 and the application server 423 could be software applications that are stored on a computer storage medium and that are executed by server system 420. The web server 422 and the firewall 424 could be standard components of the WINDOWS NT operating system in server system 420. Those skilled in the art will recognize that the server system 420 could be implemented in numerous different configurations without departing from the scope of the invention. For example, multiple interconnected computers could be configured with server software. The invention is not restricted to a particular server system configuration.

The access server 421 interacts with the access software application 411 to start and stop a communications session. The access server 421 broadcasts a URL over the LAN 430 twice per second. The term "broadcast" means that any device that is connected to one of the ports 431–435 and running the access software application 411 could receive the broadcast. The access server uses conventional sockets technology to determine if the computer 410 has disconnected from the LAN 430. The access server 421 instructs the application server 423 when the communications session is over.

The web server 422 returns a web page in response to each URL. The web pages typically include a start service page, a welcome back page, a stop service page, and miscellaneous pages. The start page prompts the user through service options and fees. For example, the start service page may collect a credit card number or obtain authorization to bill a user account. The miscellaneous pages could include messages for specific users, such as a page to authorize a charge for additional service. The miscellaneous pages could also include other information, such as restaurant menus for a hotel.

The application server 423 manages the service. The application server 423 interacts with the web server 422 to provide web pages to the user. The application server 423 instructs the firewall 424 to open and close ports to the Internet. The application server 423 exchanges user messages and session status with the access server 421.

The web server 422 and application server 423 can work together to tailor a web page based on a specific user's IP address or MAC address. When the web browser 412 contacts the web server 422 with the user's IP or MAC address, the web server 422 provides the user's IP or MAC address to the application server 423. The application server 423 checks the status of the IP or MAC address. If a communications session is not in progress, the application server 423 instructs the web server to return the start page to the web browser 412. In some instances, a communications session may still be in progress. For example, the user may pay for 24 hours of use, but may shut down a session to go to sleep and then start another session in the morning. In this case, the start page is unnecessary, and the application server 423 instructs the web server to return a welcome back page with current session status and usage information to the web browser 412.

The access server 421 and the application server 423 can work together to send informational messages to the user. Some examples of informational messages are messages that inform the user that a cab is available or that inform the user to authorize extension of the communications session. The application server 423 can send a message to the access server 421, and the access server 421 can send the message to the access software application 411 for presentation to the user. Presentation may entail changing the color of the icon for the access software application 411 to indicate a new message to the user. The application server 423 can also send a message URL to the access server 421, and the access server 421 can send the message URL to the access software application 411. The access software application 411 then directs the computer 410 to execute the currently running web browser 412 or another instance of the web browser 412 using the message URL. The message URL identifies a web page in the web server 422 that contains the message for the user.

The firewall 424 is a conventional component that forms a boundary between two networks. Typically, a firewall provides Internet access to users on an internal network, but protects the internal network from unwanted intrusion from the Internet. The firewall 424 opens and closes ports for particular IP addresses based on instructions from the application server 423. The firewall 424 is typically connected to an Internet Service Provider (ISP) over a high-speed connection using technologies such as Time Division Multiplexing (TDM) or Synchronous Optical Network (SONET). A typical high-speed connection would be a TDM T1 or a SONET OC-3. The firewall 424 could also provide a proxy for the user. The proxy uses a proxy address to exchange information for a user over the Internet. The proxy then uses the user's IP address to exchange the information with the user over the LAN 430. The web browser 412 can access the proxy service in the firewall 424 by using the proxy address provided by the access server 421.

It should be appreciated that a user can connect the portable computer 410 to one of the ports 431–435 and automatically receive a web page. If the user responds positively to the web page, the user can then use the web browser 412 to communicate over a high-speed connection to the Internet 440. The user need not use conventional telephone lines or perform complex configuration procedures. The computer 410 is automatically re-configured to communicate over the office network when the user returns to the office.

FIGS. 5–6 depict exemplary operation of the system depicted on FIG. 4. FIGS. 5–6 are viewed chronologically in the time domain from the top down and depict the sequence of messages and information that are transferred between the system elements. Those skilled in the art will appreciate variations from this specific operation that do not depart from the scope of the invention. The invention is not limited to the specific operation depicted on FIGS. 5–6.

The access server 421 broadcasts access information over the LAN 430 twice every second. The access information includes an optional encryption key, an optional proxy address, and URLs. The encryption key is used to encrypt communications to the access server 421. The proxy address is used if the firewall 424 offers a proxy service to the Internet 440. The URLs identify a start service web page, an optional upgrade web page, and an optional stop service web page. Any device connected to one of the access ports 431–435 and running an access software application 411 should receive the broadcast.

The access software application 411 in the portable computer 410 processes the broadcast. The access software application 411 directs the computer 410 to execute the web browser 412 using the start information. The start information includes the start URL, and the IP address and the Media Access Control (MAC) address for the computer 410 are appended to the start URL. The access software application 411 also transfers a response message to the access server 421. The response message includes the MAC address of the computer 410 and an optional encryption key for communications with the computer 410. The response also includes the type and version of the access software application 411 and the computer 410 operating system. If a new version of the access software application 411 is available, then the access server 421 can instruct the access software application 411 to use the upgrade URL to upgrade to the access software application 411.

The web browser 412 transfers an IP message to the web server 421 using the start URL. The IP and MAC addresses for the computer 410 are appended to the URL in the message. The web server 422 processes the message and queries the application server 423 with the appended IP and MAC addresses. The application server 423 retrieves any status information for the user based on the IP and MAC addresses and returns the status information to the web server 422. The web server 422 uses the status information to build a web page for the user. If the user is currently engaged in a session, then the web server 422 builds a welcome back web page that includes current status and usage information. If the user is not currently engaged in a session, then the web server 422 builds a start service web page that includes a service menu and fee information. The start service page is typically configured to obtain some type of payment authorization, such as a credit card number or an account number. In this example, the user receives a start service web page.

The user responds positively to the start service web page, and the web browser 412 transfers a start service message to the web server 422. The web server 422 transfers a start service message for the user to the application server 423. The user is represented by both an IP and MAC address. The application server 423 instructs the firewall 424 to open a port to the Internet 440 for the IP address.

At this point, the user has access to the Internet 440 over a high-speed connection, such as a LAN coupled to a SONET OC-3. The user can access web sites or set-up a tunneled connection to a corporate network. If the firewall 424 provides a proxy service, then the web browser 412 uses the proxy address provided by the access software application 411 to communicate through the firewall 424. If desired, the web browser may be allowed to communicate directly through the firewall 424 without a proxy.

The Internet session continues on FIG. 6 with examples of user messaging. The application server 423 has two methods for messaging the user. In the first method, the application server 423 sends the message and MAC address for the user to the access server 421. The access server 421 sends the message to the access software application 411 in the computer 410 as identified by the MAC address. The access software application 411 notifies the user that a message has been received from the system 400. Notification could entail changing the color of the icon for the application 411 in the operating system task bar or the system tray.

In the second method, the application server 423 sends a message URL and the MAC address for the user to the access server 421. The access server 421 sends the message URL to the access software application 411 in the computer 410 as identified by the MAC address. The access software application 411 directs the computer 410 to execute the currently running web browser 412 or another instance of the web browser 412 using the message URL. The web browser 412 transfers a message to the web server 422 with the message URL, and the web server 422 returns a web page with the message to the web browser 412. The web browser 412 then displays the message web page to the user. This method would useful to notify the user that additional service authorization is required, or to notify the user of other real-time events, such as the arrival of a taxi for the user.

Typically, the user will perform an orderly shut down using the operating system or the access software application 411. In either case, the access software application 411 sends a stop service message to the access server 421. The access server 421 transfers a stop service message for the user to the application server 423, and the application server 423 instructs the firewall to close the port to the Internet 440 for the user's IP address. The access software application 411 may also direct the computer 410 to execute the currently running web browser 412 or another instance of the web browser 412 using the stop service URL. The web browser 412 transfers a message to the web server 422 with the stop service URL, and the web server 422 returns a stop service web page to the web browser 412 for display to the user. The stop service web page typically thanks the user and informs the user that the session is over.

Figure 7:
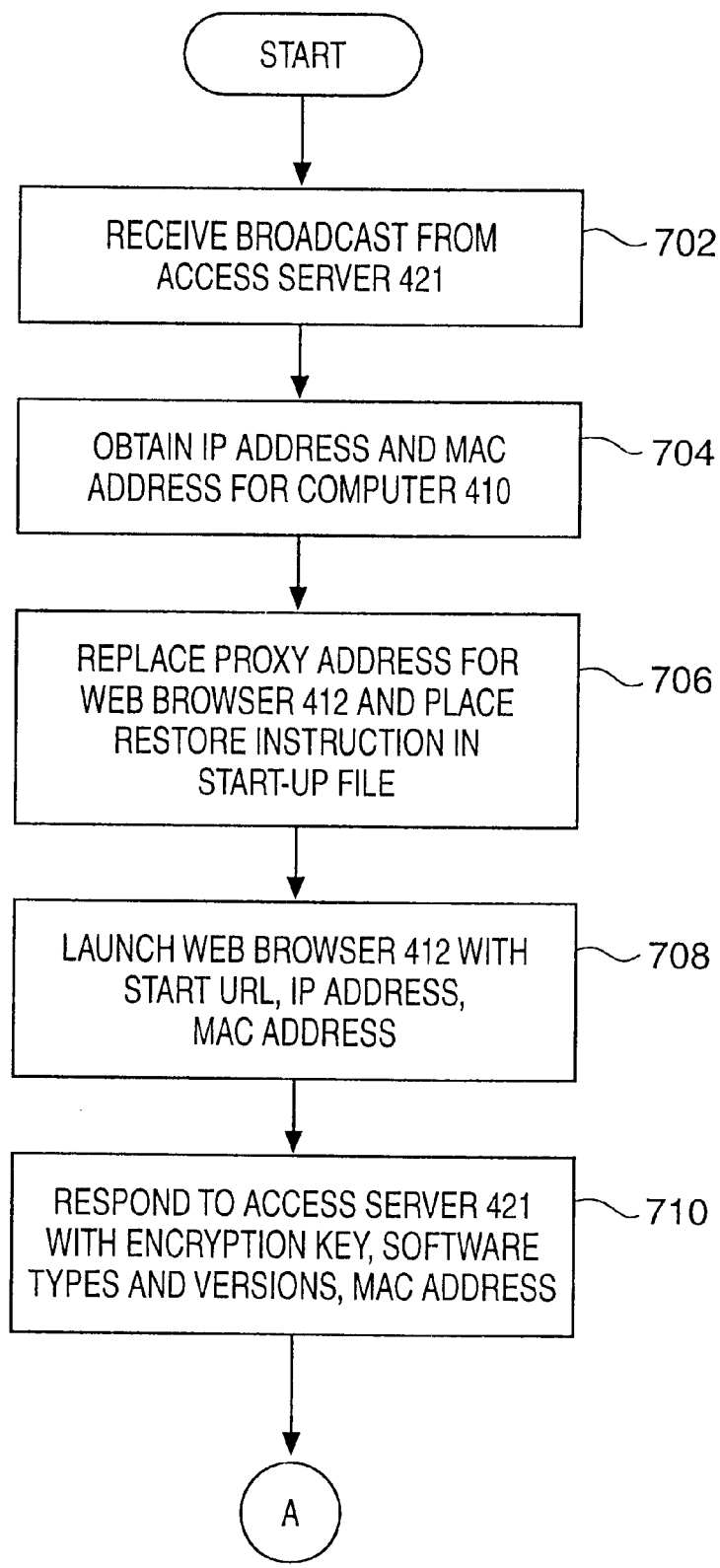
FIGS. 7–8 illustrate an example of program flow for the access software application.
Figure 8:
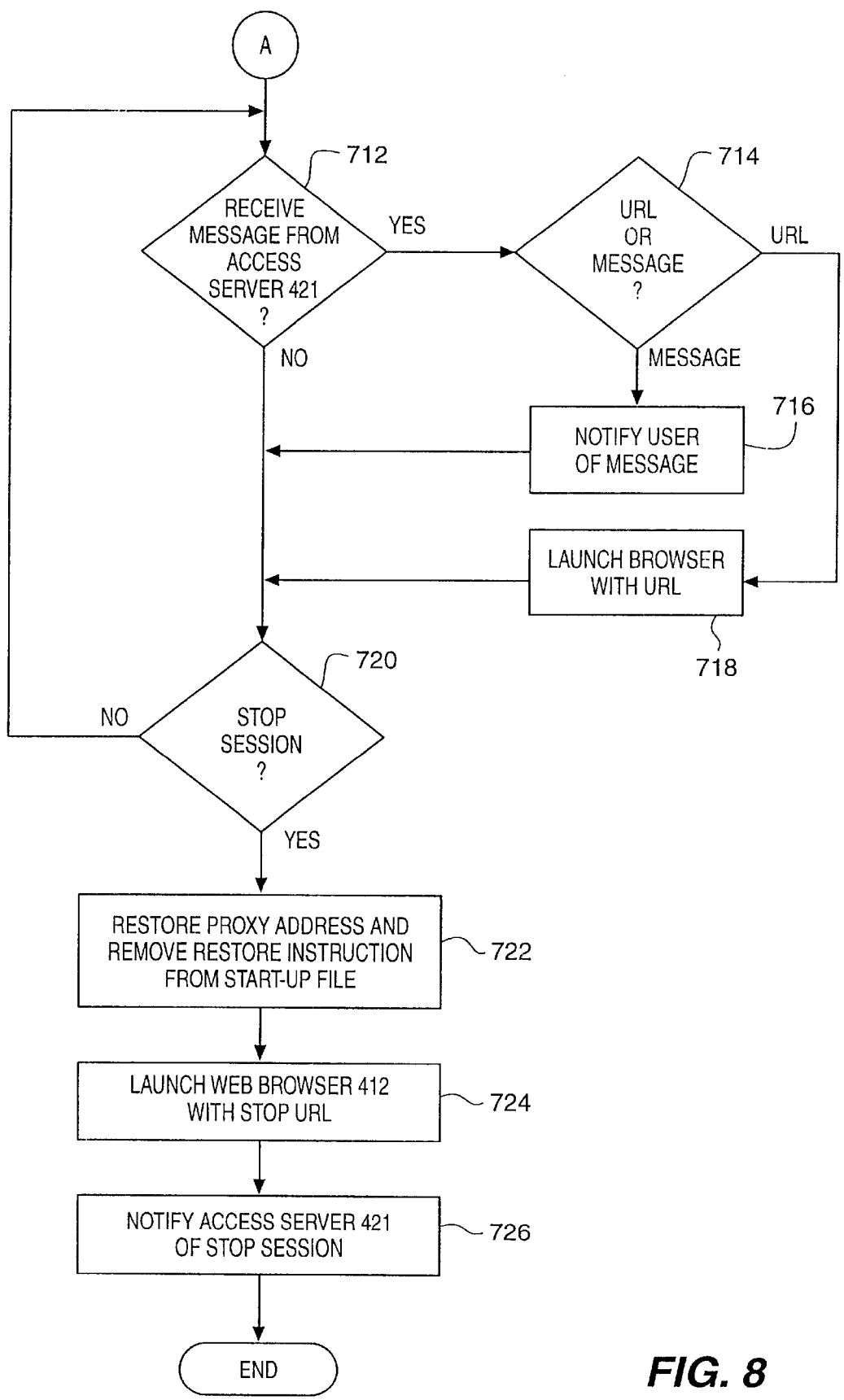

Access Software Application Program Flow—FIGS. 7–8

FIGS. 7–8 depict the program flow of the access software application 411 of FIG. 4. Those skilled in the art will recognize variations from the specific program flow on FIGS. 7–8 that do not depart from the scope of the invention. The invention is not restricted to the particular program flow depicted on FIGS. 7–8.

The program flow starts when the user initiates execution of the access software application 411. Execution could be initiated in numerous ways, such as clicking an icon, using a connection management utility, or placing a start instruction in the operating system start-up file to run the access software application 411 when the computer 410 is powered-up. In step 702, the access software application 411 directs the computer 410 to process the broadcast from an access server on the connected network. The access software application 411 obtains the IP and MAC addresses for the computer 410 in step 704. In step 706, the access software application 411 replaces the original proxy address for the web browser 412 with the proxy address from the broadcast. The access software application 411 also places an instruction in the operating system start-up file to restore the original proxy address upon subsequent start-up. The instruction will restore the computer 410 to its original configuration if the computer is powered-down without running a shut down procedure. By restoring the original configuration, the access software application 411 allows the user to return to work and plug in to the corporate network without any manual re-configuration.

The access software application 411 directs the computer 410 to execute the web browser 412 using the start URL and the IP and MAC addresses for the computer 410 in step 708. The access software application 411 directs the computer 410 to respond to the access server 421 in step 710. The response includes an optional encryption key, the MAC address for the computer 410, and the type/version of the access software application 411 and the operating system in the computer 410.

In step 712 on FIG. 8, the access software application 411 awaits a message from the access server. If a message is received from the access server 421, the access software application 411 checks for the message itself or for a message URL in step 714. If the actual message is present, the access software application 411 directs the computer to notify the user in step 716, such as by changing the color of an icon. If a message URL is present at step 714, the access software application 411 directs the computer 410 to execute the currently running web browser 412 or another instance of the web browser 412 using the message URL in step 718.

In step 720, the access software application 411 awaits a stop session instruction from the user. If a stop session instruction is received, the access software application 411 restores the original proxy address to the web browser 412 and removes the restore proxy address instruction from the operating system start-up file in step 722. In step 724, the access software application 411 directs the computer 410 to execute the currently running web browser 412 or another instance of the web browser 412 using the stop service URL. In step 726, the access software application 411 directs the computer 410 to send a stop service message to the access server 421. If the computer 410 is configured with a static IP address instead of a proxy address, the access software application 411 would save and restore the static IP address in the same manner as described above for the proxy address.

Figure 9:
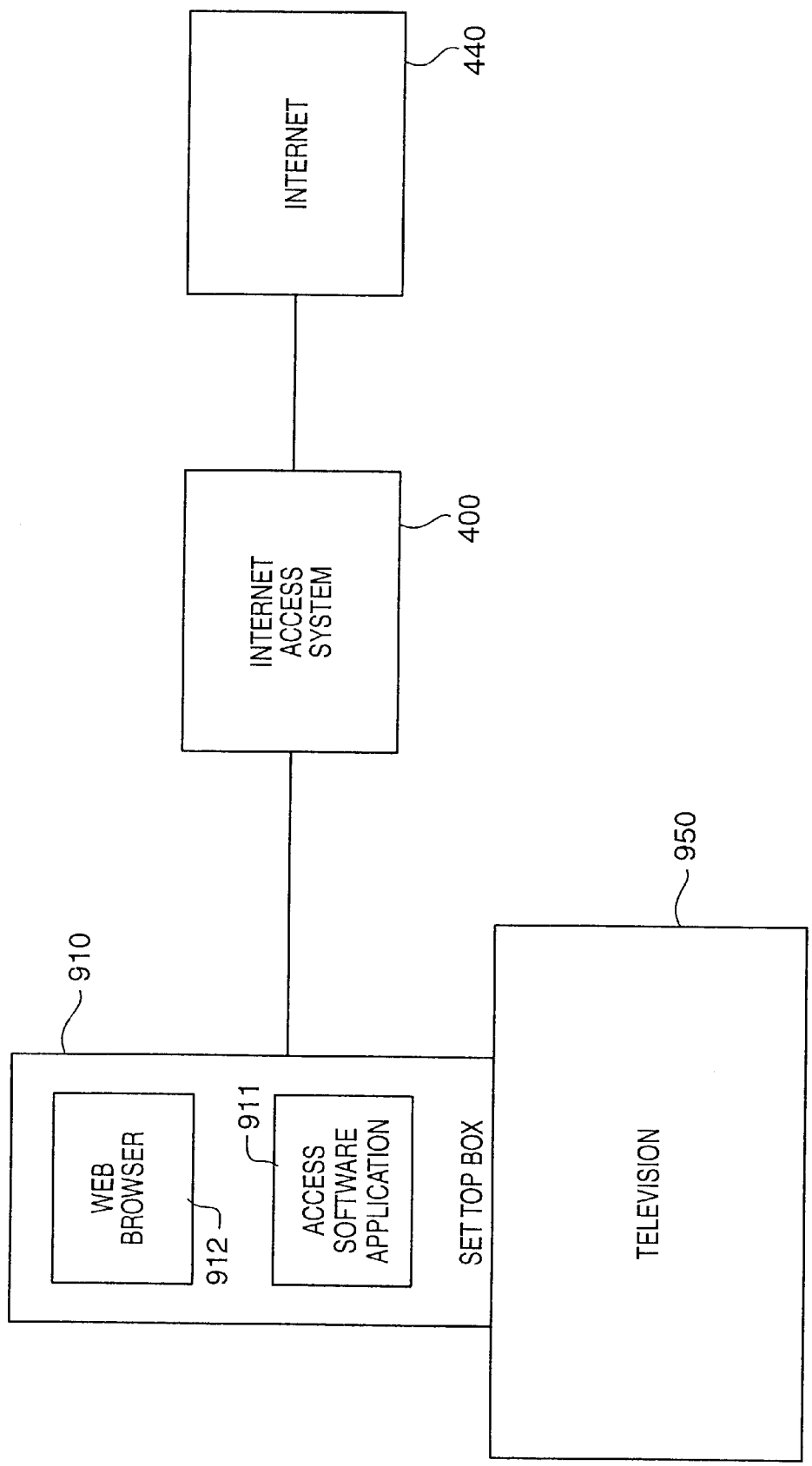
FIG. 9 illustrates an example of an Internet access system for a television set-top box.

Alternative System Configuration for a Television Set-Top Box—FIG. 9

Televisions are being configured to operate under the control of set-top boxes that communicate with the internet. FIG. 9 depicts an alternative system where a television set-top box 910 is connected to the Internet access system 400 of FIG. 4. The Internet access system 400 is connected to the Internet 440. The Internet access system 400 is configured and operates as described above. The television set-top box 910 is coupled to a television 950.

The television set-top box 910 includes an access software application 911 and a web browser 912. The access software application 911 and the web browser 912 are similar to the access software application 411 and the web browser 412 described above for FIG. 4. The television set-top box 910 could be a conventional device configured to execute the access software application 911 and the web browser 912. Those skilled in the art are familiar with television set-top boxes, and how such a device is configured with software.

The access software application 911 receives a broadcast URL and directs the set-top box 910 to launch the web browser 912 with the URL. The set-top box 910 displays the web page obtained with the URL on the television 950. The web page prompts the user of the television 950 to start Internet service. If selected, the set-top box is connected to the Internet 440 over a high-speed connection as described above for FIG. 4.

Those skilled in the art will appreciate variations of the above-described embodiments that fall within the scope of the invention. Therefore, the invention is not limited to the specific embodiments discussed above, but only by the following claims and their equivalents.

What is claimed is:

1. A method employed by a computer for establishing communications with a communications server, the method comprising:

receiving an address broadcast from an access server over a network, wherein the address is for the communications server;

processing the address in response to executing an access software application;

executing a communications software application using the address;

communicating with the communications server at the address in response to executing the communications software application;

receiving a new proxy address from the access server over the network;

storing an original proxy address existing prior to receiving the new proxy address;

executing the communications software application using the new proxy address;

communicating with the Internet using the new proxy address; and restoring the original proxy address subsequent to communicating with the Internet using the new proxy address.

2. The method of claim 1 further comprising executing the access software application in response to starting the computer.

3. The method of claim 1 further comprising executing the communications software application in response to receiving the address.

4. The method of claim 1 further comprising restoring the original proxy address after the computer is powered-down and re-started.

5. The method of claim 4, wherein the communications server is a web server, the address is a universal resource locator, and the communications software application is a web browser.

6. The method of claim 1 wherein the computer is a portable computer.

7. The method of claim 1 wherein the computer is a television set-top box.

8. The method of claim 1, wherein the communications server is a web server, the address is a universal resource locator, and the communications software application is a web browser.

9. The method of claim 8 further comprising receiving another uniform resource locator from the access server, wherein the other uniform resource locator is for another web page in the web server;

processing the other uniform resource locator;

executing the web browser using the other uniform resource locator;

transferring the other uniform resource locator to the web server in response to executing the web browser; and receiving another web page from the web server in response to transferring the other uniform resource locator to the web server.

10. The method of claim 8 further comprising:

executing the web browser using an Internet address;

transferring the Internet address to the web server in response to executing the web browser; and receiving the web page from the web server in response to transferring the Internet address to the web server.

11. The method of claim 8 further comprising:

executing the web browser using a media access control address;

transferring the media access control address to the web server in response to executing the web browser; and receiving the web page from the web server in response to transferring the media access control address to the web server.

12. A method employed by a computer for establishing communications with a computer and a communications server, comprising:

receiving an address broadcast from an access server over a network, wherein the address is for the communications server;

processing the address in response to executing an access software application;

executing a communications software application using the address;

communicating with the communications server at the address in response to executing the communications software application;

receiving a new proxy address from the access server over the network;

storing a static Internet address for the communications software application which static Internet address existed prior to receiving the new proxy address;

executing the communications software application using the new proxy address;

communicating with the Internet using the new proxy address; and restoring the static Internet address subsequent to communicating with the Internet using the new proxy address.

13. The method of claim 12 further comprising restoring the static Internet address to the communications software application after the computer is powered-down and re-started.

14. The method of claim 13, wherein the communications server is a web server, the address is a universal resource locator, and the communications software application is a web browser.

15. The method of claim 12, wherein the communications server is a web server, the address is a universal resource locator, and the communications software application is a web browser.

16. The method of claim 12 further comprising executing the access software application in response to starting the computer.

17. The method of claim 12 further comprising executing the communications software application in response to receiving the address.

18. The method of claim 12 wherein the computer is a portable computer.

19. The method of claim 12 wherein the computer is a television set-top box.

20. A method for establishing communications between a computer and a web server, comprising:

broadasting an uniform resource locator from an access server over a network, wherein the uniform resource locator corresponds to a web page in the web server;

receiving at the web server the uniform resource locator and an Internet address for the computer;

transferring a query containing the Internet address for the computer from the web server to an application server;

in the application server, identifying status information for the Internet address in response to the query;

transferring a response from the application server to the web server containing the status information;

in the web server, generating the web page in response to the status information, and transferring the web page to the computer.

21. A method comprising:

broadcasting an uniform resource locator from an access server over a network, wherein the uniform resource locator corresponds to a web page in the web server;

receiving at the web server the uniform resource locator and a media access control address;

transferring a query containing the media access control address for the computer from the web server to an application server;

in the application server, identifying status information for the media access control address in response to the query;

transferring a response from the application server to the web server containing the status information;

in the web server, generating the web page in response to the status information; and transferring the web page to the computer.

22. A product that stores computer-executable instructions for directing a computer to access a server when the computer is connected to a network and executes the instructions, the product comprising:

interface instruction that are operational, when executed, to direct the computer to process a broadcast from the network, wherein the broadcast includes an address for the server;

processing instructions that are operational, when executed, to direct the computer to communicate with the server at the address in the broadcast, process a new proxy address after communicating with the server, store an original proxy address for the computer, communicate using the new proxy address, and restore the original proxy address after communicating using the new proxy address; and;

a software storage medium for storing the interface instructions and the processing instructions.

23. The product of claim 22 wherein the processing instructions are further operational, when executed, to direct the computer to communicate with the server using an Internet address for the computer.

24. The product of claim 22 wherein the processing instructions are further operational, when executed, to direct the computer to communicate with the server using a media access control address for the computer.

25. The product of claim 22, wherein the proxy address is restored after the computer is powered-down and re-started.

26. A product that stores computer-executable instructions for directing a computer to access a server when the computer is connected to a network and executes the instructions, the product comprising:
   interface instructions that are operational, when executed, to direct the computer to process a broadcast from the network, wherein the broadcast includes an address for the server;
   processing instructions that are operational, when executed, to direct the computer to
      communicate with the server at the address in the broadcast,
      process a new proxy address after communicating with the server,
      store a static Internet address for the computer,
      communicate using the new proxy address, and
      restore the static Internet address after communicating using the new proxy address; and
   a software storage medium for storing the interface instructions and the processing instructions.

27. The method of claim 26, wherein the static Internet address is restored after the computer is powered-down and re-started.

28. The product of claim 22 wherein the interface instructions are further operational, when executed, to direct the computer to process another address from the network and to communicate using the other address.

* * * * *

UNITED STATES PATENT AND TRADEMARK OFFICE
CERTIFICATE OF CORRECTION

PATENT NO.    : 6,466,981 B1
DATED         : October 15, 2002
INVENTOR(S)   : Steven B. Levy It is certified that error appears in the above-identified patent and that said Letters Patent is hereby corrected as shown below:

<u>Column 4,</u>
Line 24, "InpuVOutput" has been replaced with -- Input/Output --.

Signed and Sealed this

Fifteenth Day of July, 2003

JAMES E. ROGAN
*Director of the United States Patent and Trademark Office*